(12) United States Patent
Väyrynen et al.

(10) Patent No.: US 7,178,725 B2
(45) Date of Patent: Feb. 20, 2007

(54) METHOD FOR VISUALIZING THE INPUT AND DISPLAY COMPONENTS OF TERMINAL EQUIPMENT AND CORRESPONDING TERMINAL EQUIPMENT

(75) Inventors: Antero Väyrynen, Oulu (FI); Kaj Saarinen, Turku (FI)

(73) Assignee: Nokia Corporation, Espoo (FI)

( * ) Notice: Subject to any disclaimer, the term of this patent is extended or adjusted under 35 U.S.C. 154(b) by 8 days.

(21) Appl. No.: 10/874,886

(22) Filed: Jun. 23, 2004

(65) Prior Publication Data
US 2005/0017064 A1 Jan. 27, 2005

(30) Foreign Application Priority Data
Jun. 24, 2003 (FI) .................................. 20035105

(51) Int. Cl.
*G06K 5/00* (2006.01)
(52) U.S. Cl. .................... 235/382; 340/426.2; 455/403
(58) Field of Classification Search ................ 235/382, 235/472.01; 455/575.1, 550.1, 566, 403; 340/5.2, 5.61, 5.62, 426.2
See application file for complete search history.

(56) References Cited
U.S. PATENT DOCUMENTS

| | | | | |
|---|---|---|---|---|
| 6,141,436 A * | 10/2000 | Srey et al. | .................. | 382/124 |
| 6,141,568 A * | 10/2000 | Sakaguchi | .................. | 455/566 |
| 6,278,887 B1 * | 8/2001 | Son et al. | .................... | 455/566 |
| 6,370,362 B1 * | 4/2002 | Hansen et al. | ............. | 455/90.1 |
| 6,411,198 B1 * | 6/2002 | Hirai et al. | .................. | 340/7.6 |
| 6,606,332 B1 * | 8/2003 | Boscha | ........................ | 372/42 |
| 6,664,744 B2 * | 12/2003 | Dietz | ......................... | 315/291 |
| 6,667,731 B2 * | 12/2003 | Park | .......................... | 345/102 |
| 6,678,534 B2 * | 1/2004 | Ishigaki | .................... | 455/556.1 |
| 6,829,494 B2 * | 12/2004 | Tanabe | ........................ | 455/574 |
| 6,831,721 B2 * | 12/2004 | Maeda et al. | ................ | 349/117 |
| 2001/0015718 A1 | 8/2001 | Hinckley et al. | ............ | 345/156 |

FOREIGN PATENT DOCUMENTS
EP 0453089 B1 5/1996

* cited by examiner

*Primary Examiner*—Ahshik Kim
(74) *Attorney, Agent, or Firm*—Harrington & Smith, PC

(57) ABSTRACT

The invention relates to a method for visualizing the input and display components of terminal equipment. The terminal equipment includes the said input component for controlling the operations of the terminal equipment and the display component. The terminal equipment (10) has at least two states, of which in the first, open, state, the terminal equipment implements the operations directed to it through the input component and in which second, locked, state, the terminal equipment does not implement the operations directed to it through the input component but instead implements an indicator effect in the input and/or the display component in order to visualize the input and/or the display component.

17 Claims, 3 Drawing Sheets

METHOD FOR VISUALIZING THE INPUT AND DISPLAY COMPONENTS OF TERMINAL EQUIPMENT AND CORRESPONDING TERMINAL EQUIPMENT

FIELD OF THE INVENTION

The present invention relates to a method for visualizing the input and display components of terminal equipment, in which the terminal equipment includes the said input component, for controlling the operations of the terminal equipment, and the display component, and in which terminal equipment there are at least two states, of which in the first, open, state, the terminal equipment implements the operations directed to it through the input component, and in which second, locked, state, the terminal equipment does not implement the operations directed to it through the input component, but instead implements an indicator effect in the input and/or the display component, in order to visualize the input and/or the display component.

In addition, the invention also relates to corresponding terminal equipment.

BACKGROUND OF THE INVENTION

Users of mobile stations find the opening of the keypad lock to be problematic, especially in conditions with a restricted level of lighting. In some manufacturers terminal equipment, if the keypad is in the locked state, a random keystroke will not activate the illumination of the keypad and the display, which instead requires the correct keys to be pressed in the correct sequence and results in both the illumination being activated and the keypad lock being opened.

A second alternative is to activate the keypad illumination by pressing the mobile station's power switch (Power On/Off key). From the viewpoint of the mobile station's user, the operation nevertheless takes a painfully long time in both cases, thus creating a usability problem.

Recently, mobile stations with entirely new keypad configurations have appeared on the market. In them, the arrangement of the keys is very different to the accustomed matrix configuration. In the new models, the keypad can be arranged, for example, in the form of a circle, or may be divided into two parts, which are divided, for example, by the display component. Users who are unfamiliar with the new keypad arrangements may find difficulty in forming an image of them, for example, in conditions with restricted lighting.

Further, the prior art discloses an user interface feature for visualizing a locked keypad, implemented by one terminal-equipment manufacturer. In this case, pressing any key at all in the keypad activates the illumination of the terminal equipment, which can be observed to be at full power and to cover the whole keypad component. The illumination can then last for 15–30 seconds, for instance. Similarly, the entire display component of the terminal equipment can also be observed to be illuminated at full power and is used to display an indicator effect for opening the keypad locking.

In this case, the terminal equipment quite obviously wakes from sleep mode and switches to stand-by mode. Switching to stand-by mode has, as is known, a significant effect on power consumption, particularly in portable terminal equipment.

Besides such visualization showing the location of the input and display components being performed only when the user knowingly presses some key, the visualization also takes place in several other situations without the knowledge of the user. Such situations arise, for example, when the terminal equipment is in the user's pocket or correspondingly in a terminal-equipment holder attached to their belt, where the keys may be pressed unintentionally. It is fairly obvious that all such intentional and unintentional activations will significantly affect the overall power consumption of the terminal equipment.

As the prior art of the keypad locking is also referred to the publications EP-0 453 089 B1 and EP-0 590 494 A1.

SUMMARY OF THE INVENTION

The present invention is intended to create a method for visualizing the input and display components of terminal equipment, which, from the user's viewpoint, will substantially facilitate the usability of terminal equipment and simultaneously also significantly reduce the power consumption of terminal equipment. The characteristic features of the invention are stated in the accompanying Claim 1. In addition to the above, the invention is also intended to create corresponding terminal equipment, which can be implemented using extremely simple means and with a negligible power consumption, compared to the prior art. The characteristic features of the terminal equipment according to the invention are stated in the accompanying Claim 8.

The use of the method according to the invention is particularly advantageous in a situation, in which the keypad of the terminal equipment is in a locked state and the user attempts to open the keypad lock, for example, in conditions with restricted lighting.

The method according to the invention is based on implementing, in the input and/or display component of the terminal equipment, an indicator effect with substantially reduced power consumption and/or a shorter duration, relative to the prior art, compared, for example to the power consumption of the system in a situation, in which the terminal equipment would switch from sleep mode to stand-by mode. The reduction can be implemented, for example, by using a short duration of the indicator effect, or by using a luminance that is substantially lower than the known level.

By using an indicator effect with a duration of 0.1 to 5 , for example 1–3 seconds, the location of input means, for example, a key of the keypad, can surprisingly be visualized sufficiently to the user to allow the user to continue the uninterrupted use of the terminal equipment. The use of a current of even a few microamperes will produce the indicator effect required to detect the position of the input means. In general, a current of, for example, less than 1 milliampere will be found sufficient, depending, for example, on the technical manner of implementing the keypad.

According to a second embodiment, such an indicator effect can be implemented in one or more selected points in the input and/or display components of the terminal equipment. According to a third embodiment, the luminance of the guide effect visualized in the input and/or display components can also be negligible, compared to present methods of visualization. One example of the brightness range defined as luminance can be $0.1–5 cd/m_2$. Further, combinations of all of these embodiments are naturally also possible.

The terminal equipment according to the invention can even be implemented using components that already exist.

Thus, the terminal equipment does not necessarily require unreasonable modifications, in order to implement the indicator effect according to the invention. In addition, indicator effects like those described above can be created using the driver implementations and lighting means that already exist in terminal equipment.

According to yet another embodiment, the implementation of the indicator effect according to the invention can be synchronized to take place simultaneously with the performance of routine operations in the terminal equipment.

In addition, the use of the method according to the invention can significantly extend the stand-by time of the terminal equipment by reducing the current, compared, for example, to the manner of operation in which the illumination is activated in the input and/or display component with full brightness and an arbitrary duration.

The object of the operation activating the visualization can be selected very freely on the input component. The interface settings set by the user for the terminal equipment can also influence the selection of the activation point and/or manner.

Other characteristic features of the method and terminal equipment according to the invention will become apparent from the accompanying Claims while additional advantages that can be achieved are itemized in the description portion.

BRIEF DESCRIPTION OF THE DRAWINGS

In the following, the method and terminal equipment according to the invention, which are not restricted to the embodiments disclosed in the following, are examined in greater detail with reference to the accompanying drawings, in which.

DETAILED DESCRIPTION OF THE INVENTION

The method according to the invention can be exploited advantageously in several types of terminal equipment. Of these, the principle advantage is achieved particularly in terminal equipment, in which the power consumption is intended to be minimized. One example of such a group of terminal equipment is wireless mobile terminal equipment. On the other hand, the method according to the invention can also be implemented in so-called intelligent telephones and pocket computers.

Figure 1:
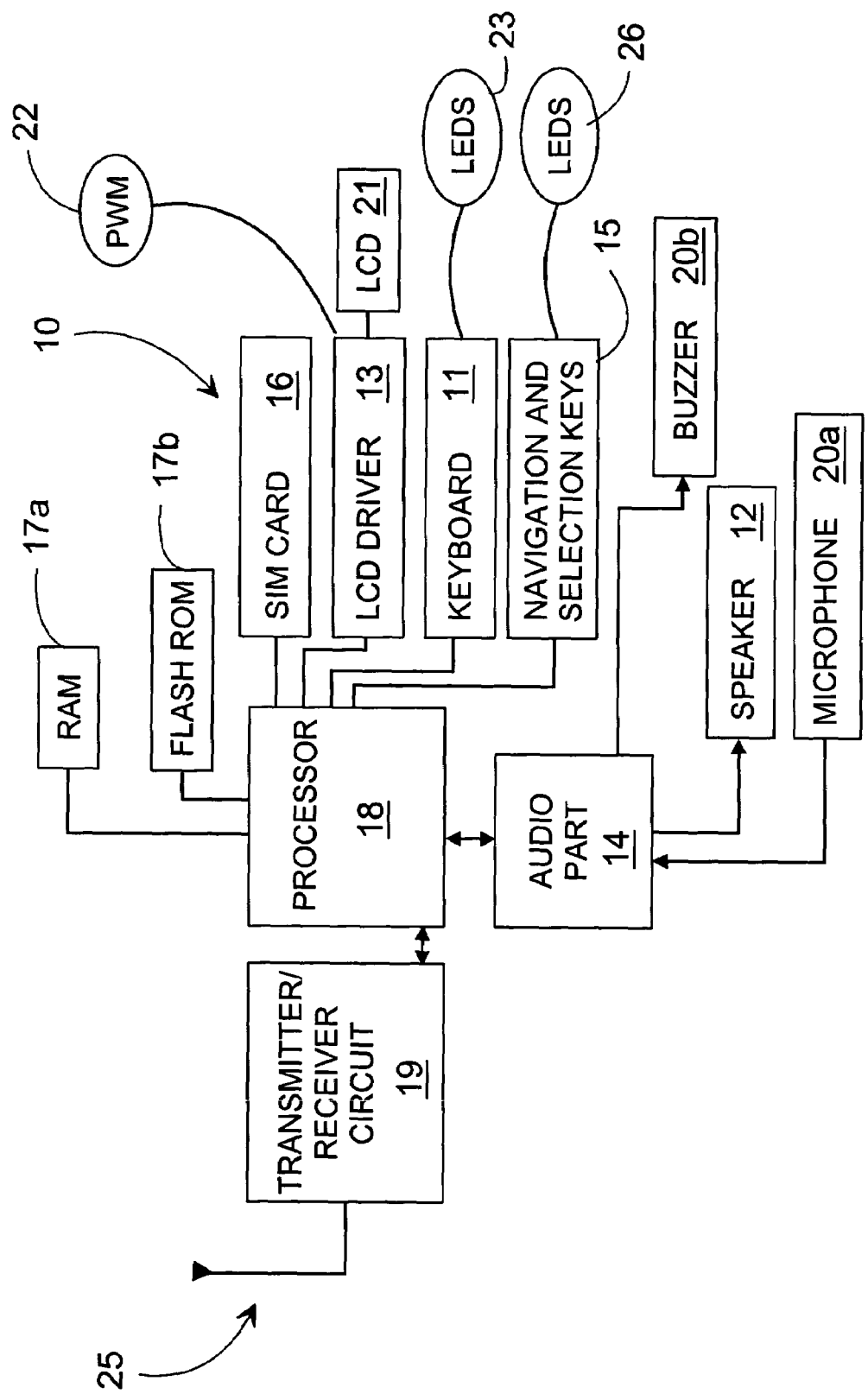
FIG. 1 shows a rough schematic diagram of terminal equipment according to the invention.

FIG. 1 shows one example of the logical totalities forming mobile equipment 10. It will be obvious to one versed in the art that the logical totalities of a mobile station 10 can vary even greatly compared to those shown, so that the rough schematic diagram should in no way be interpreted as being restrictive. The mobile station 10 includes modules and functional blocks, which as such will be obvious to one versed in the art and which are principally all connected to a processor unit 18. Such modules, which are only given as examples, are the transmitter/receiver circuits 19 connected to an antenna 25, the various types of memory 17a, 17b, a subscriber identity module SIM 16, a microphone 20a, a buzzer or similar audible signal module 20b, and a speaker 12. The microphone 20a, the buzzer 20b, and the speaker 12 are connected to the processor unit 18 by means of an audio part 14, which includes technology that, as such, will be known to one versed in the art.

The method according to the invention relates to the input and display component of a mobile station 10 and particularly to visualization that appears in them when the keypad is locked. In this case, the input component can be understood to be the keypad 11, 15 of the terminal equipment and also, in general, keys or switches (keypad, keyboard, control pad, rotate switch, PTT button) that can be controlled by the user and are arranged in connection with the terminal equipment 10, in order to control the functions of the terminal equipment 10. As is known, the keypad 11, 15 can nowadays be arranged in different configurations in connection with a mobile station 10.

As stated above, the keypad can include several types of keys 11, 15, with different forms of operation, which will also be obvious to one versed in the art. Such keys include not only the traditional combined alphanumeric keypad 11, but also navigation and selection keys 15. Nowadays, the keys 11, 15 also have back-lighting 23, 26, using techniques that are, as such, known. The lighting 23, 26 can include lighting of only the edges of the keys 11, 15, and/or lighting through the keys.

Further, the terminal equipment 10 also includes a display component 21. The type of the display 21 can be, for example, an LCD (Liquid Crystal Device). Connected to the display 21, there is an LCD driver 13, which is used to control the operation of the display. In connection with the LCD driver 13, there is, for example a PWM (Pulse Width Modulation) implementation, which is used to control the operation of the display 21.

Still in addition to the above, all kinds of display panels that can be controlled by touch can be regarded as belonging to the input and display components. One example of their implementation is displays based on capacitive detection, on which it is possible to 'draw', using a special 'pen' belonging to the device. Such displays are known, for example, from palm computers and similar intelligent 'pocket computers' which use "touch-detection" feature.

Figure 2:
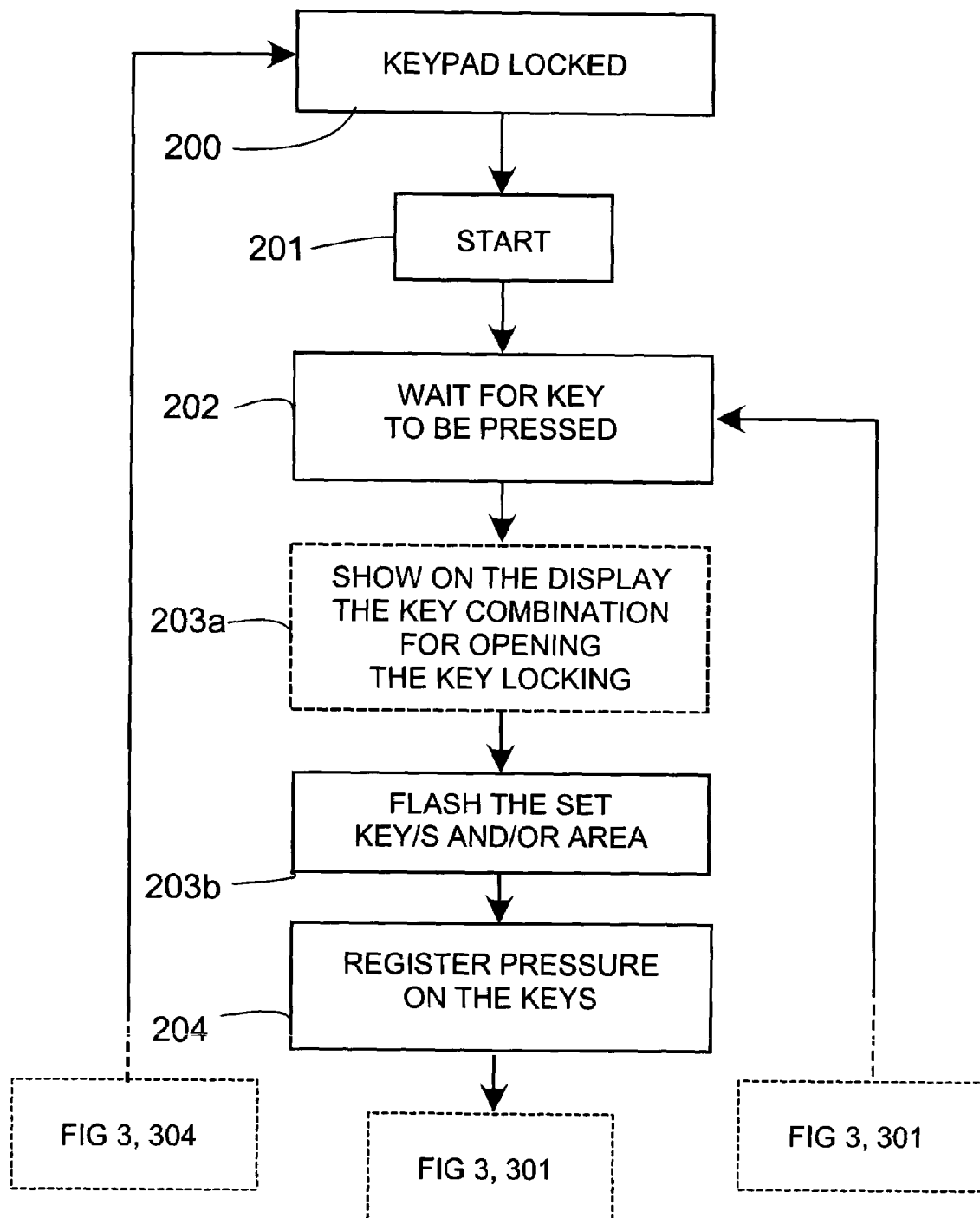
FIGS. 2 and 3 show flow diagrams of some embodiments for implementing the method according to the invention, in terminal equipment according to the invention.
Figure 3:
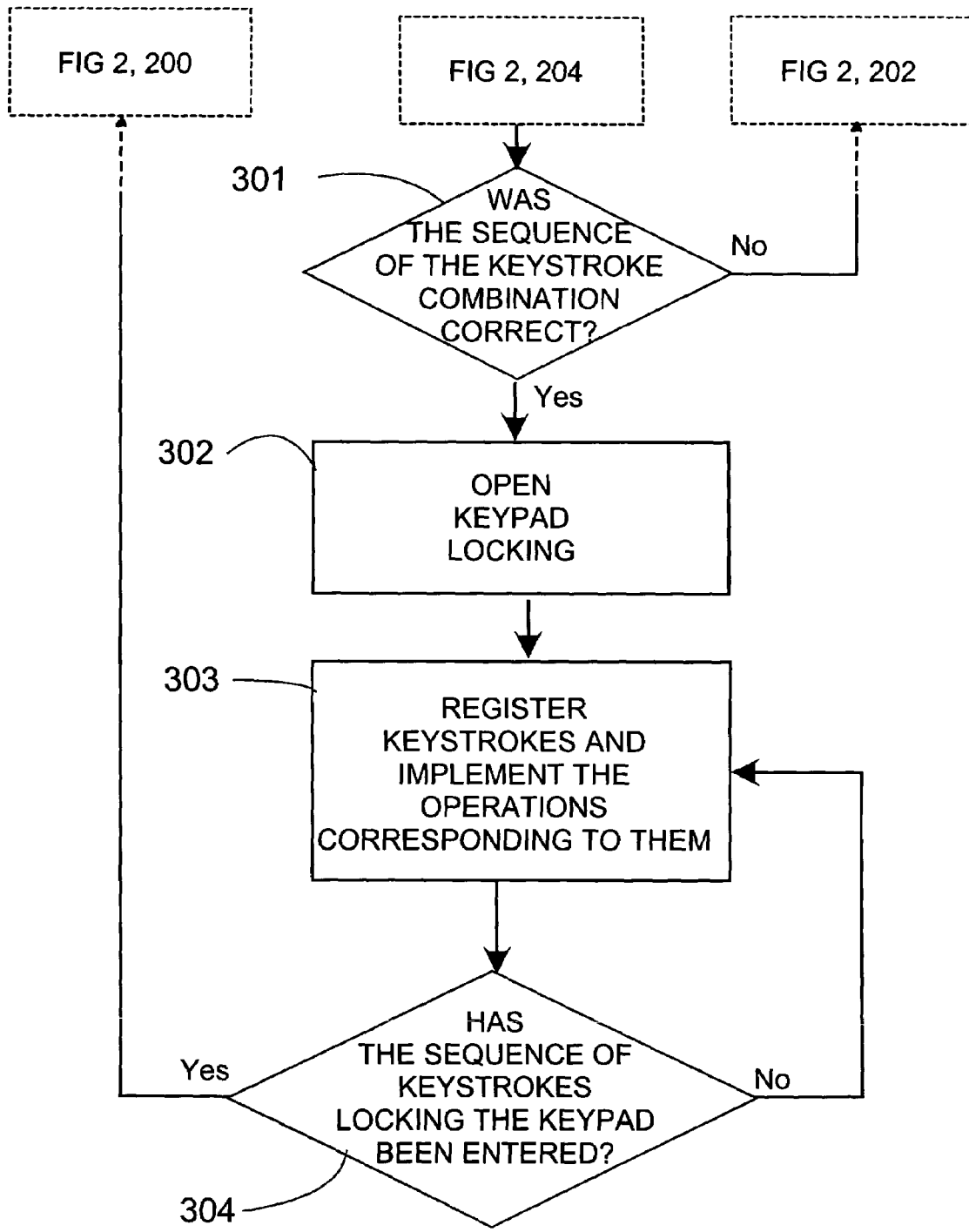

FIGS. 2 and 3 show a flow diagram of one embodiment of the method according to the invention. In FIG. 2, prior to arriving at the flow diagram, the user has activated the keypad lock function (200) in terminal equipment of the type described. The locking of the keypad 11 is a state that can be set in the terminal equipment, in which, following its activation, the terminal equipment 10 will not react to pressures directed onto the keys 11, 15, and thus will not perform operations directed to it. This is intended to prevent the unintentional operation of the terminal equipment 10 if, for example, there is pressure on the keypad 11, 15 when the terminal equipment is in the user's pocket.

The locking of the keypad 11, 15 can be opened in a known manner, using a particular combination of keys. The specific keys that open the locking are then pressed, for example, essentially in a particular sequence. Generally, the opening procedure is manufacturer-specific. Thus, in one first case, it can consist of pressing consecutively the left-hand soft-key and the *-key. In the case of a second manufacturer, the locking can be opened by pressing consecutively the navigation and selection keys.

Thus, in FIG. 2, the user has set the keypad-locked function to be active (200), resulting in the terminal equipment 10 locking its keypad 11, 15 and possibly simultaneously transferring to the so-called sleep state (201). When the user presses some key of the keypad 11, 15, for example, at random, the terminal equipment detects this pressure (202). The key can be pressed, for example, for a shorter or longer time, which can be set, for example, in the interface settings. The pressing can follow the indication shown on the display for opening the keypad locking (203*a*). The indication can be set as an option from the interface settings, if, for example, the user is familiar with the interface characteristics of their terminal equipment (10). Operation according to the method of the invention follows the terminal equipment's 10 detection of pressure.

In the method according to the invention, the terminal equipment 10 according to the invention implements, in the input and/or display component 11, 15, 21, preferably a barely discernable visual indicator effect (203*b*). The indicator effect can be set to be a flash in one or more keys and can be implemented immediately the user has pressed some key in the keypad 11, 15.

In the method according to the invention, the light effect is implemented to a substantially restricted extent. The effect can be implemented so that it is either extremely short and/or substantially dimmer than in the prior art. The duration of the effect can be 0.1 to 5 seconds, for example 1–3 seconds. The essential point is that the user must be able to discern the effect, i.e. that its duration is mainly determined by the time required for human perception. Such a light effect has an insignificant effect on the power consumption of the terminal equipment 10 compared, for example, to a situation in which there is a transfer from a sleep state to a stand-by state.

If the said indicator effect is created in the keys that open the keypad-locking, the terminal equipment 10 will register pressure directed onto its keypad (204).

In FIG. 3, the terminal equipment 10 interprets the pressure (301) directed onto it by the user. If the key combination is correct, and if it has been given in the set manner essentially consecutively, then the terminal equipment 10 opens the locking (302). However, if the user entered the wrong combination of keys, or if the time between the consecutive keystrokes was, for example, too long, the procedure returns to stage (202).

After opening the keypad locking, the terminal equipment's 10 keypad 11, 15 transfers to the open state of the keypad lock, i.e. to the state that registers keystrokes and implements the operations corresponding to them (303). Operations can be implemented, for example, until the user enters the keystroke combination in the keypad 11, 15 that locks the keypad (304). Another criterion for locking the keypad 11, 15 can be, for example, that no keystrokes have been entered in the keypad during a set period of time. If the keypad 11, 15 has not been touched for the set time, for example, for 30 seconds, the keypad lock is reactivated. After this, the performance of the method once again starts from the beginning, i.e. it returns to stage (201).

According to a first embodiment, the visual indicator effect showing the location of the input component can consist of a flash, barely discernable to the user, in a set pattern, in one or more of the keys 11, 15. The flash can preferably be directed to occur only in the keys that lead to the opening of the keypad lock, for example, in the sequence of keystrokes that has been set to open the keypad lock.

According to a second embodiment, in addition to, or alternatively instead of the above, the visual indicator effect can be implemented in the display 21 of the terminal equipment 10. A selected area of the display 21 can easily be illuminated for a short time and/or dimly, or the display can alternatively also be illuminated in its entirety.

On the other hand, according to one embodiment, the level of brightness of the indicator effect can also be selected in such a way that it consumes a negligible amount of current, compared, for example, to the amount used if the terminal equipment 10 wakes from a sleep state to a stand-by state. One example of such a barely discernable brightness can be stated as luminance of 0.1–5 cd/m$_2$, preferably 0.5–3 cd/m$_2$.

Luminance is a generally used measure when analysing the illumination of the keypads and displays of terminal equipment. One example of a level of barely discernable luminance can be even less than 1 cd/m$^2$. In practice, in conditions of restricted lighting, such as in the dark, the user will become sufficiently conscious of the location of the keys of the input component 11, 15 of terminal equipment 10 using a light effect with even a very low brightness (i.e. a luminance of even less than 1 cd/m$^2$). Colours cannot be detected at such low levels of luminance, but the essential feature of the method according to the invention is the ability to distinguish the desired keys. If it is wished to include colours in the indicator effect, the rough lower limit of the luminance value will be approximately 3 cd/m$^2$.

According to yet another embodiment, the indicator effect can also be synchronized with routine operations performed by the terminal equipment. For example, according to the prior art, GSM terminal equipment monitors the data-transfer network every few seconds and performs, for example, location updatings in it. The synchronization of the indicator effect with such routine operations will then bring additional advantages in power consumption, as in principle both operations can be implemented using nearly the same consumption of power, due to the small amount of current consumed by the indicator effect. On the other hand, alternating operation may also be possible, in which case the indicator effect will be arranged to be implemented between these network monitoring routines, but the moments when both commence and terminate will be triggered essentially nearly simultaneously.

In its most advantageous form of implementation, the method according to the invention consumes very little current. Nowadays, even a few microamperes are sufficient to create a light effect discernable to the user in the LEDs 23, 26 used in terminal equipment 10. In sufficiently dark conditions, the glow created using this current consumption is enough to show the user the position of the input component. However, a more practical level of current consumption may be a few milliamperes, in which case the necessary visualization will be achieved in twilight conditions too. Generally, the current consumption can be set to be, for example, 0.5–1.5 mA, preferably less than one milliampere. Even then, the level of power consumption will nevertheless remain substantially less than that in normal operating conditions, or if the terminal equipment 10 is woken from a sleep state to a stand-by state.

The essential feature of the method and terminal equipment according to the invention is that the intention is to minimize the energy consumed by the indicator effect. In the case of the terminal equipment 10, this can be reduced to the product of the current used and the duration, or even more generally to the product of the power used and the duration.

By way of example, and with reference to the above, the capacity of the battery of terminal equipment can be 900 mAh. In the prior art, in which illumination of the entire keypad is activated for, for example, 15 seconds, as much as about 300 mAs of charge can be consumed. This result is reached if there are ten LEDs in the keypad, each with a current in the order of 2 mA. If the indicator effect is implemented according to the method of the invention, i.e. using, for example, a single LED for a duration of, for example, 2 seconds, the charge consumed by the effect will be only 4 mAs. It is obvious that, in the long run, if the indicator effect is used and is even activated as a result of completely unintentional pressure on a key, this will have the effect of clearly reducing the general current consumption of the terminal equipment.

According to yet another embodiment, means (not shown) can also be arranged in the terminal equipment 10 for detecting the level of illumination. These means can be used to adjust not only the brightness and duration of the desired visual indicator effect, but also to decide whether there is even any need to produce the indicator effect at all.

The indicator effect according to the invention can be implemented easily, for example, in present terminal equipment. Terminal equipment 10 generally includes, for example, a modulation functionality 22, by means of which the functions relating to the display component 21, for instance, can be controlled. Such a modulation functionality 22 can be implemented, for example, using a PWM (Pulse Width Modulation) module, or, as another alternative example, an AM (Amplitude Modulation) module. In the case of the AM module, the terminal equipment 10 includes a functionality for implementing low-current control by static means. This can be achieved by, for example, altering the magnitude of the restriction resistor. A modulation functionality 22, or alternatively some other manner can also be used in the production of the indicator effect according to the invention.

The above is a description of the method according to the invention, and of terminal equipment implementing it, as an individual example of an embodiment. It will be obvious to one versed in the art that the technical implementation of the terminal equipment may differ, even considerably, from that described above, so that the embodiment described must thus in no way be interpreted as being restrictive. The essential feature of the method and terminal equipment according to the invention is that the input and/or display component is illuminated either partly, or entirely in a selected area using a current consumption that is substantially more restricted, relative to the prior art. This is achieved using, for example, a short and/or a dimmer light effect.

It must be understood that the above description and the related figures are only intended to illustrate the method and the terminal equipment, according to the present invention. The invention is thus in no way restricted to only the embodiments disclosed or stated in the Claims, but many different variations and adaptations of the invention, which are possible within the scope on the inventive idea defined in the accompanying Claims, will be obvious to one versed in the art.

What is claimed is:

1. A method for visualizing the input and display components of terminal equipment, in which the terminal equipment includes the said input component, for controlling the operations of the terminal equipment, and the display component, and in which terminal equipment there are at least two states, of which in the first, open, state, the terminal equipment implements the operations directed to it through the input component, and in which second, locked, state, the terminal equipment does not implement the operations directed to it through the input component, but instead implements an indicator effect in at least one of the input and the display component, in order to visualize at least one of the input and the display component, characterized in that the said indicator effect is implemented by means of light with at least one of a duration of about 0.1 to about 5 seconds and with a luminance of about 0.1 to about 2 $cd/m^2$.

2. A method according to claim 1, characterized in that the duration of the said indicator effect is 1–3 seconds.

3. A method according to claim 1, characterized in that the said indicator effect is implemented in at least the input component opening the locking of the terminal equipment by pressing one or more keys in a predetermined sequence.

4. A method according to claim 1, characterized in that the said indicator effect is implemented in at least part of the display component of the terminal equipment.

5. A method according to claim 1, characterized in that the implementation of the said indicator effect is synchronized with routine operations performed by the terminal equipment.

6. A method according to claim 1, characterized in that the indicator effect is implemented using a modulation functionality belonging to the terminal equipment.

7. A method according to claim 6, wherein the modulation functionality is Pulse Width Modulation (PWM).

8. A method according to claim 6, wherein the modulation functionality is Amplitude Modulation (AM).

9. A method according to claim 1, characterized in that the terminal equipment includes means for defining the lighting conditions in which the ambient lighting conditions at each moment are defined and at least one of the duration and the luminance of the indicator effect are adjusted on the basis.

10. Terminal equipment comprising a keypad component, a means for lighting, and a display component, wherein the keypad component and the display component are arranged so as to be illuminated by the means for lighting in which the said keypad component is arranged to be locked such that the terminal equipment is unable to perform operations, the keypad component being arranged to create an indicator effect to visualize the keypad component, wherein the terminal equipment implements the indicator effect by activating the means for lighting with at least one of a duration of about 0.1 to about 5 seconds and a luminance of about 0.1 to about 2 $cd/m_2$.

11. Terminal equipment according to claim 10, characterized in that the indicator effect is implemented using a modulation module.

12. Terminal equipment according to claim 10, further comprising a mechanism to provide a functionality for synchronizing the implementation of the indicator effect with routine operations to be performed by the terminal equipment.

13. Terminal equipment according to claim 11, wherein the modulation module is Pulse Width Modulation (PWM) module.

14. Terminal equipment according to claim 11, wherein the modulation module is Amplitude Modulation (AM) module.

15. A wireless mobile terminal equipment, comprising:
a plurality of keys;
a display;
a means for lighting the display and the plurality of keys, wherein the plurality of keys have an unlocked state and a locked state, the unlocked state permitting input from the plurality of keys to perform operations on the wireless mobile terminal equipment, the locked state preventing input from the plurality of keys to perform operations on the wireless mobile terminal equipment and providing an indicator effect in at least one of the plurality of keys and the display, wherein the plurality of keys enter the unlocked state from the locked state through input of a predetermined combination of keys of the plurality of keys in a particular sequence, wherein the indicator effect is an illumination of at least one of the plurality of keys for at least one of a predetermined duration and a predetermined luminance, wherein the indicator effect is the illumination of the at least one of the plurality of keys for at least one of a predetermined duration of 1 to 3 seconds and a predetermined luminance of 0.1 to 5 cd/m$_2$.

16. A wireless mobile terminal equipment according to claim 15, wherein the indicator effect further comprises is an illumination of the display for at least one of a predetermined duration and a predetermined luminance.

17. A wireless mobile terminal equipment according to claim 15, wherein the predetermined combination of keys of the plurality of keys in a particular sequence is shown on the display.

* * * * *